United States Patent [19]

Nadherny et al.

[11] 4,360,299

[45] Nov. 23, 1982

[54] SELF-RESETTING SNUBBING AND ANCHORING DEVICE

[75] Inventors: Rudolph E. Nadherny, Naperville, Ill.; Theodore J. Sweger, Lake Worth, Fla.

[73] Assignee: Illinois Railway Equipment Company, Chicago, Ill.

[21] Appl. No.: 189,002

[22] Filed: Sep. 22, 1980

[51] Int. Cl.³ .......................... B60P 7/10; B60P 7/16; B61D 3/16; B61D 45/00

[52] U.S. Cl. ....................................... 410/34; 410/38; 410/100; 410/103

[58] Field of Search ....................... 410/32, 34, 38, 40, 410/100, 103

[56] References Cited

U.S. PATENT DOCUMENTS

| | | | |
|---|---|---|---|
| 804,863 | 11/1905 | Kempton | 410/34 |
| 2,628,397 | 2/1953 | Olson | 410/103 |
| 3,804,028 | 4/1974 | O'Leary et al. | 410/40 |
| 3,942,454 | 3/1976 | Broling | 410/100 |
| 4,247,235 | 1/1981 | Sunnesson | 410/100 X |
| 4,314,783 | 2/1982 | Parnell et al. | 410/34 |

Primary Examiner—Robert B. Reeves
Assistant Examiner—Howard Beltran
Attorney, Agent, or Firm—Lockwood, Dewey, Alex & Cummings

[57] ABSTRACT

Cargo carried on freight cars such as flat bed railway cars is secured in place by lading strapping that is tensioned around the cargo so as to compress a snubber unit of a self-resetting lading tie anchor and snubbing device that includes a snubber mechanism and a lading tie anchor assembly slidably mounted in a housing secured directly to the side sill of the freight car, which anchor assembly is locked in an automatically retracted position to automatically reset the device when it drops into the housing due to the force of gravity, at which position lading strapping is passed through a lading tie anchor that moves generally upwardly as tension is applied to the lading strapping in opposition to bias provided by the snubber mechanism. Unlocking of the anchor assembly quickly releases the device to substantially reduce tension within the lading strapping before it is removed from the cargo.

24 Claims, 28 Drawing Figures

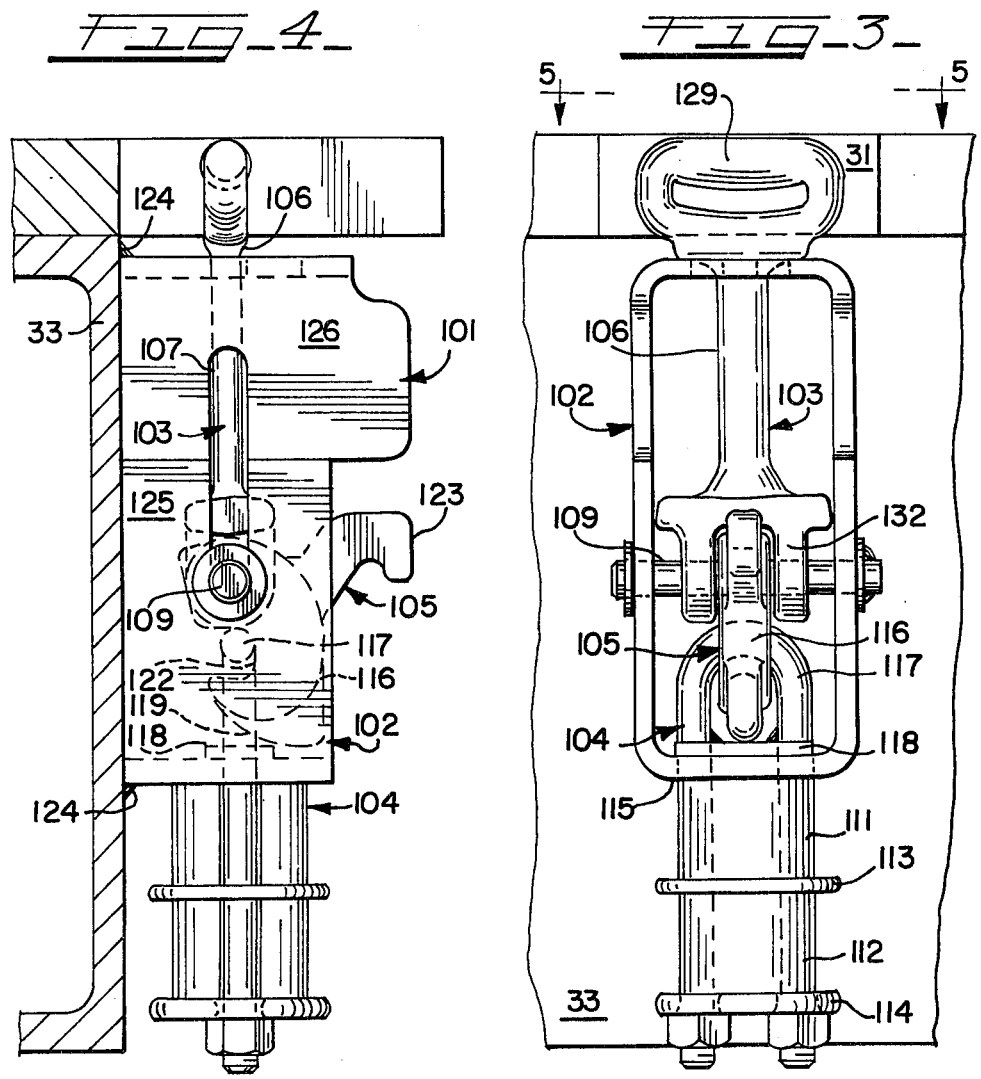

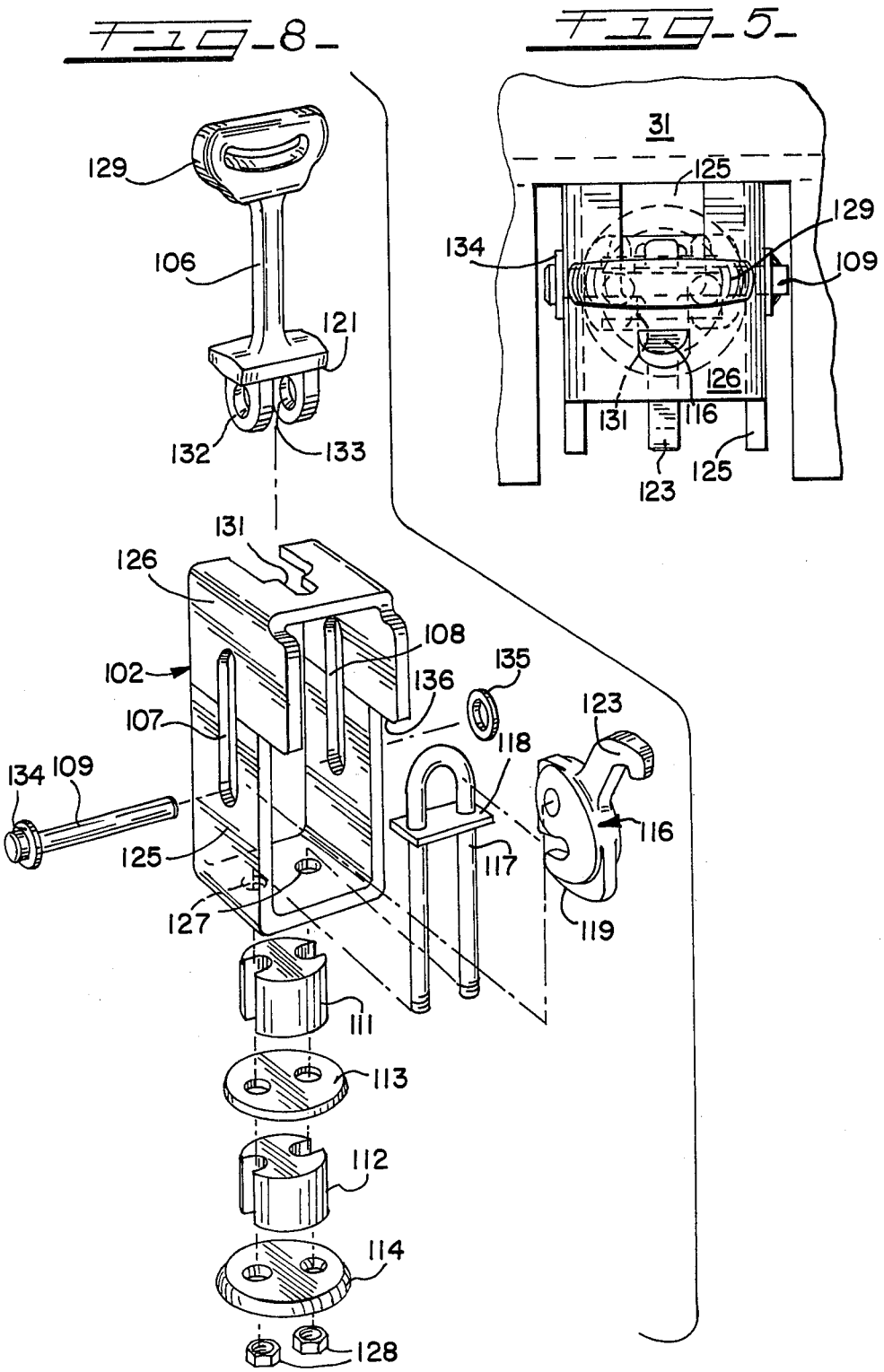

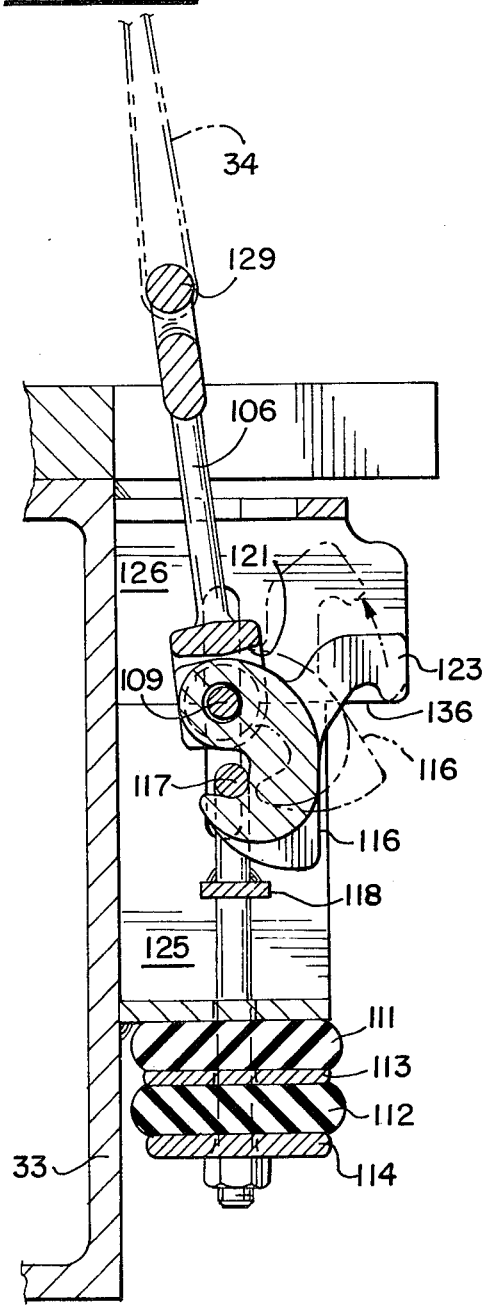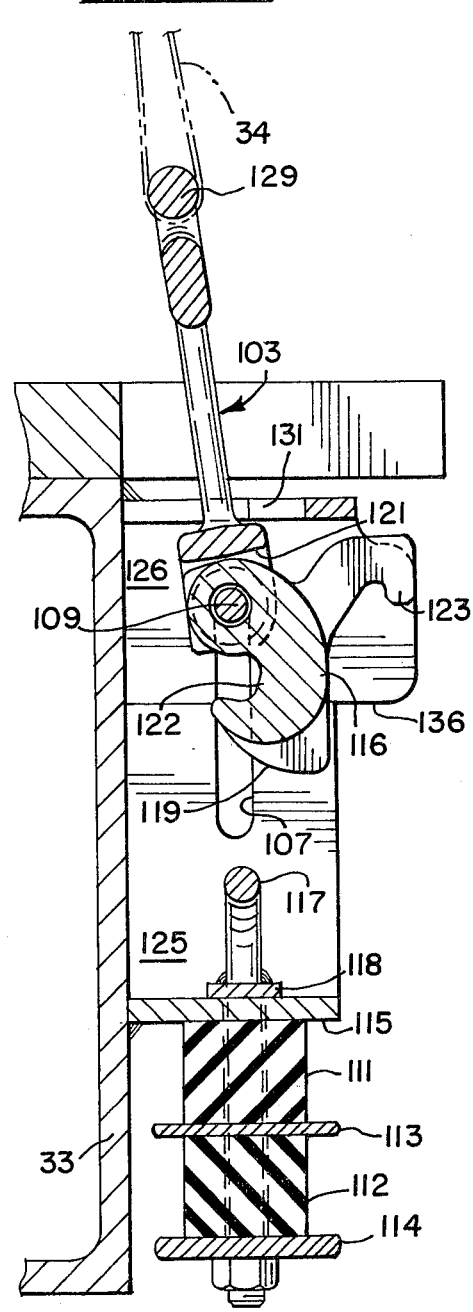

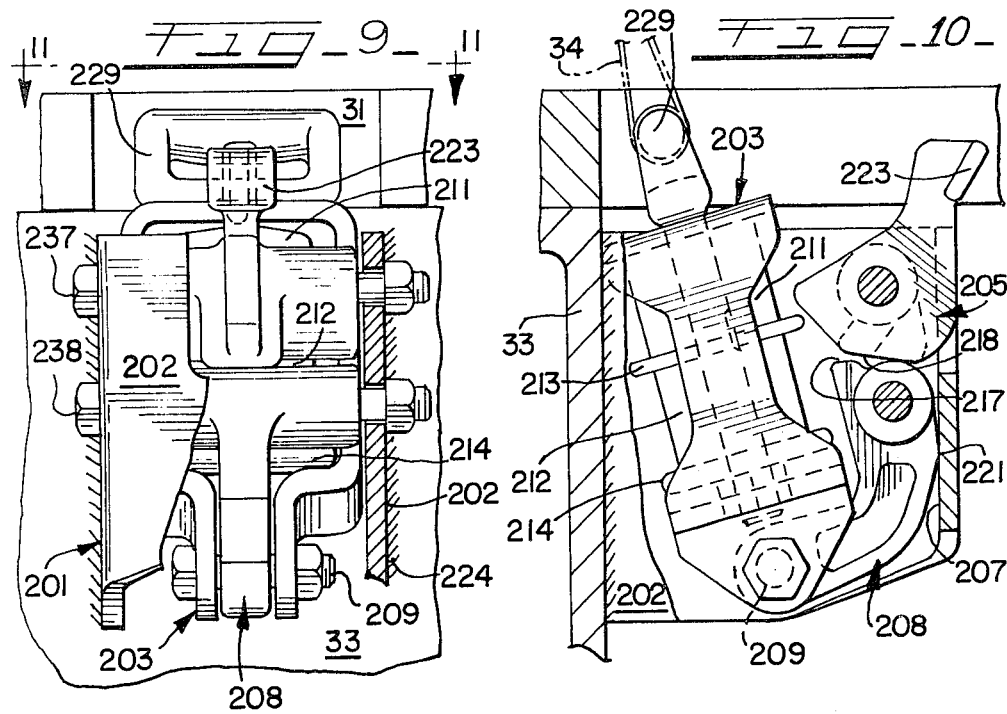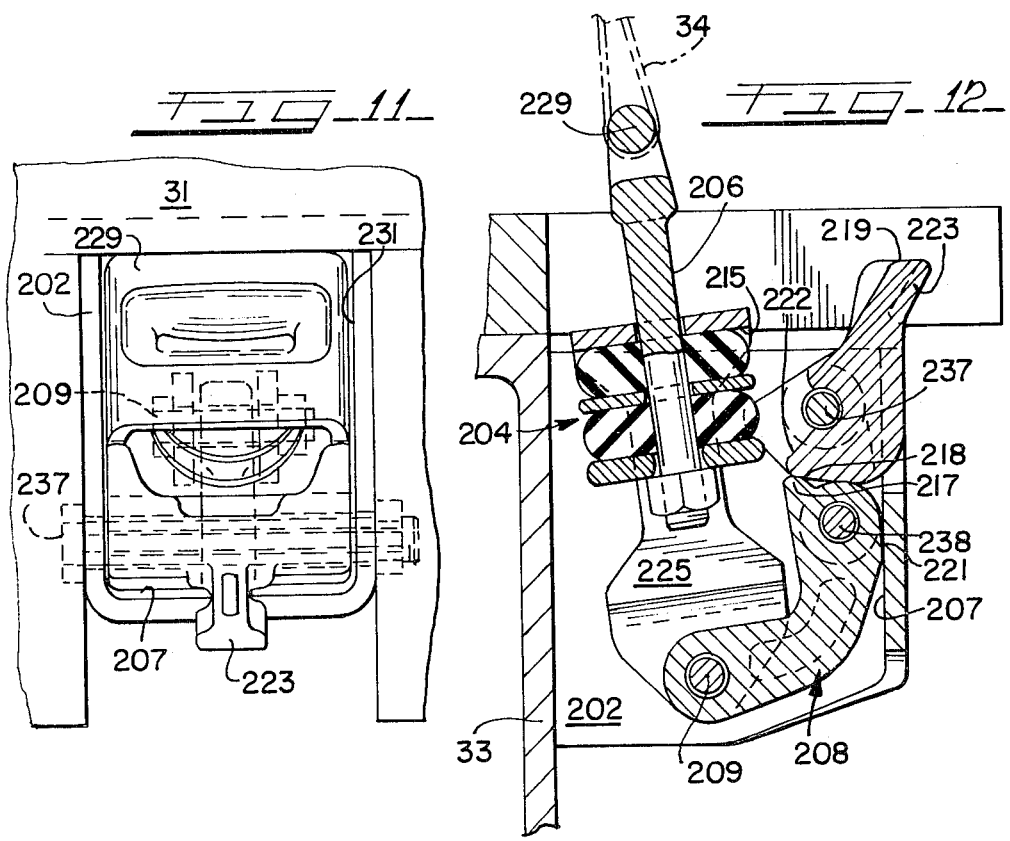

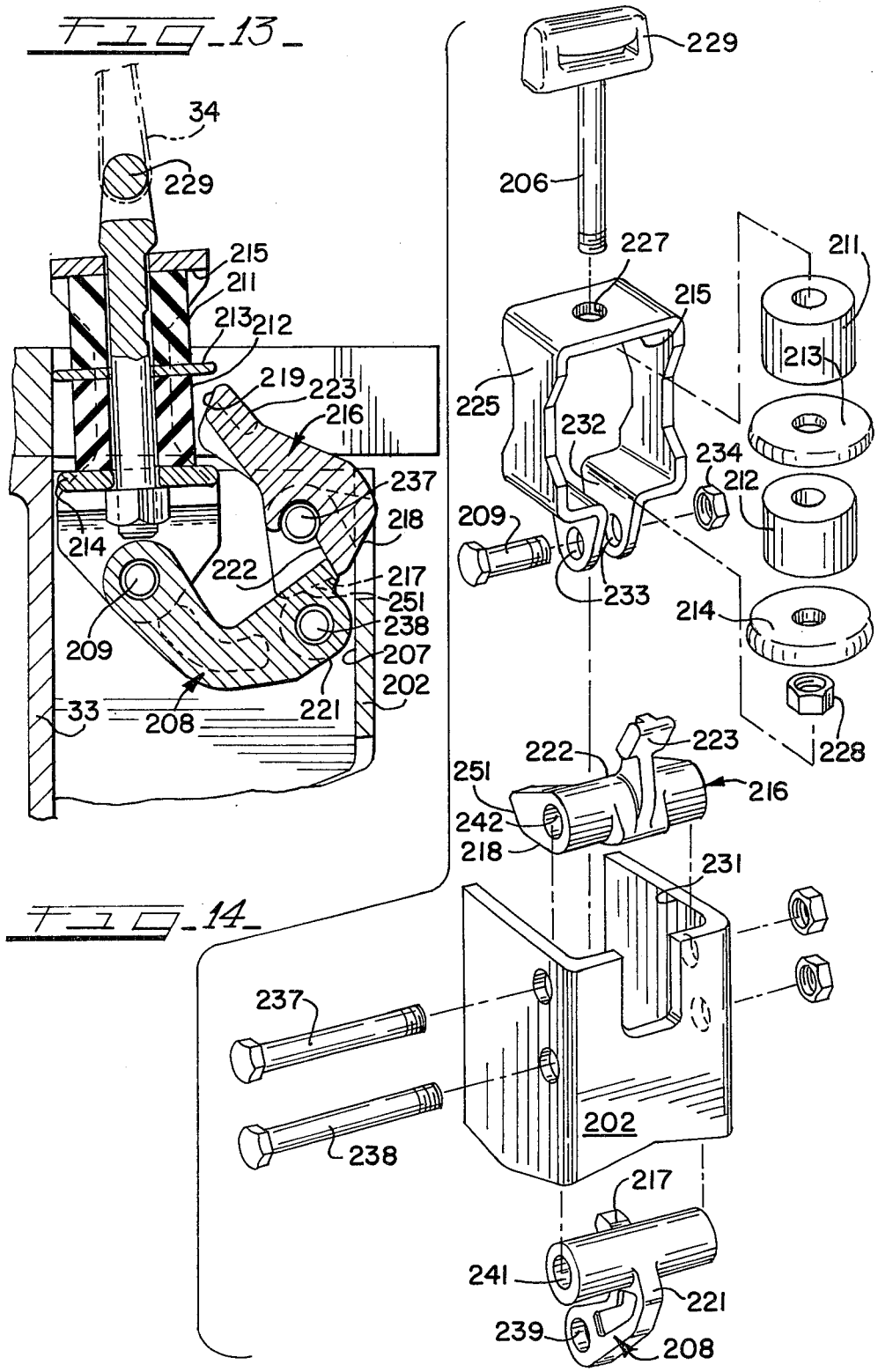

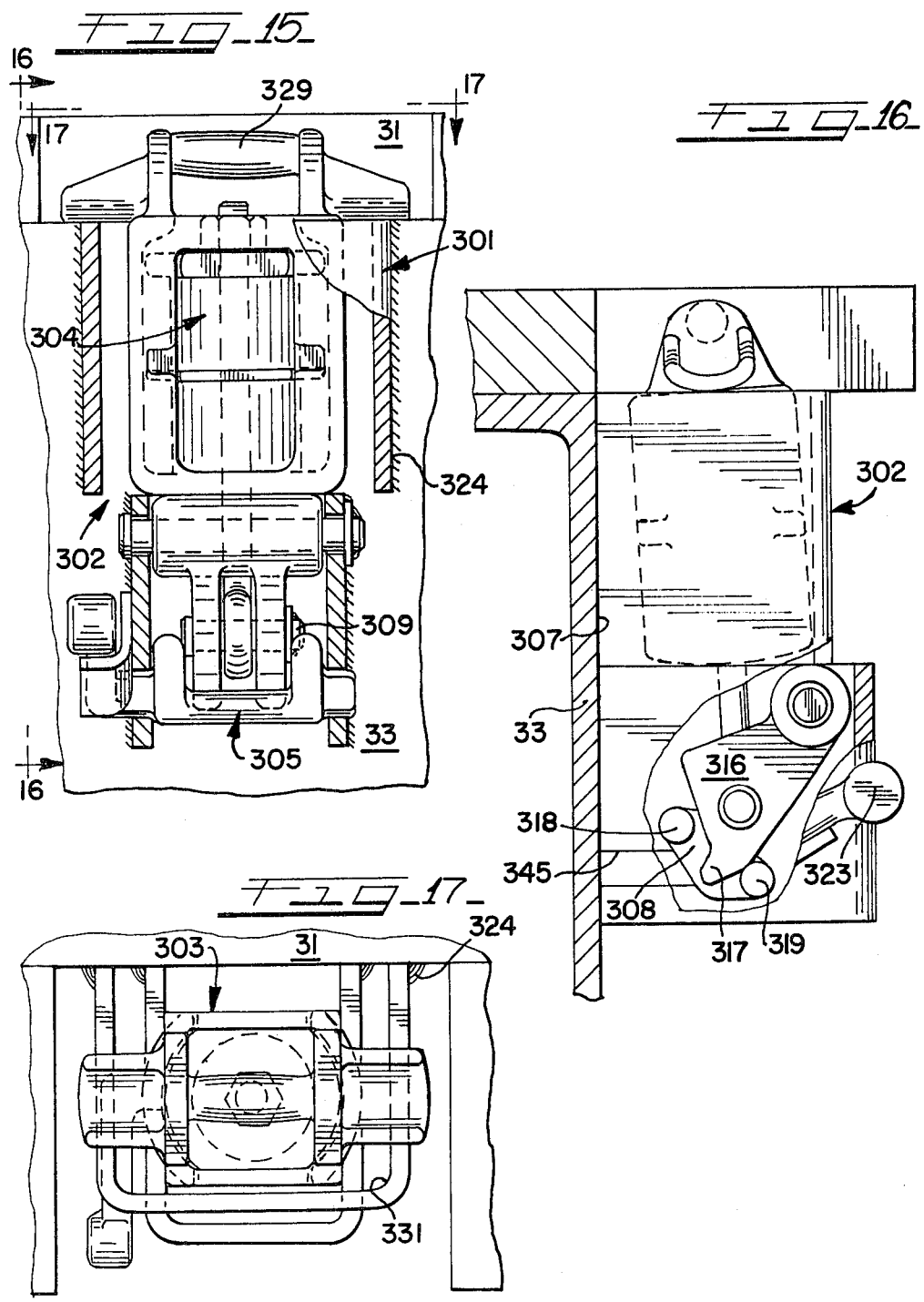

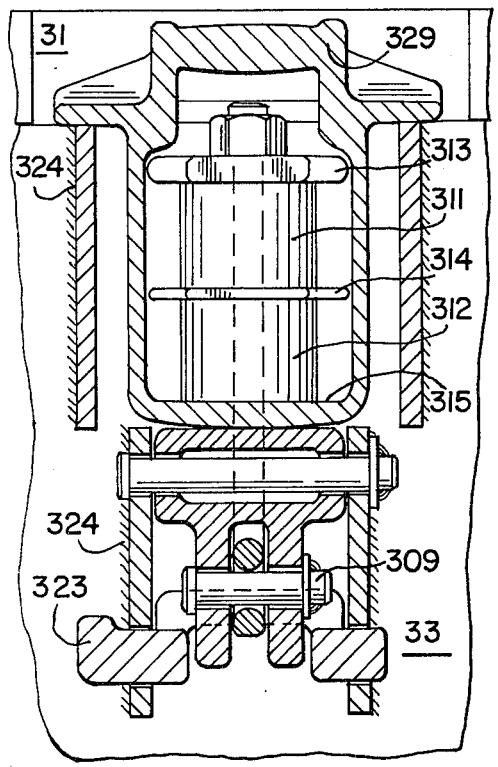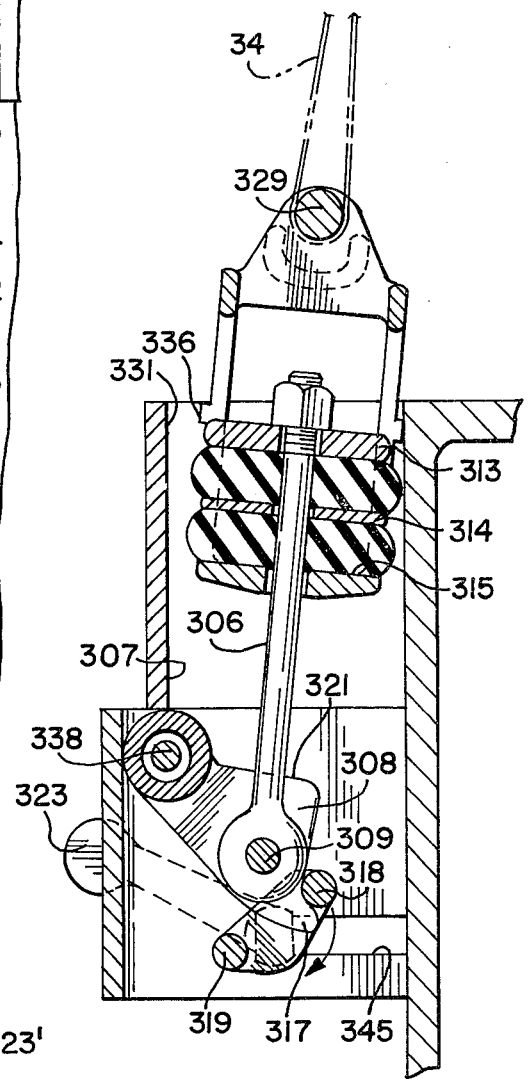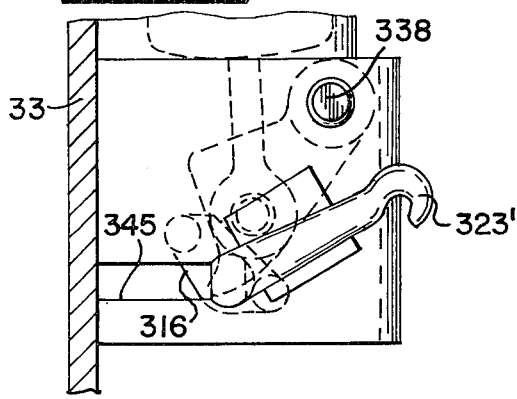

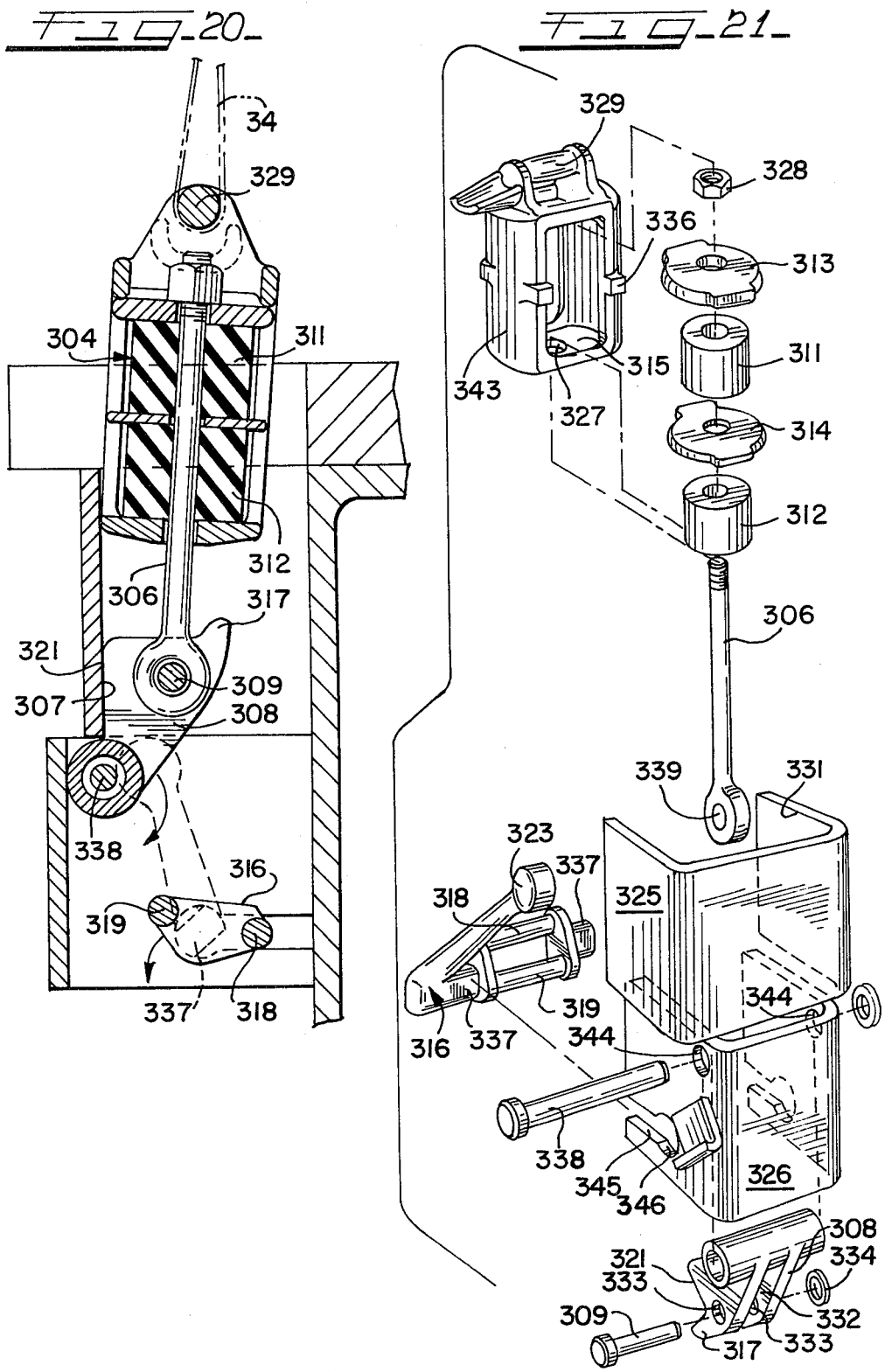

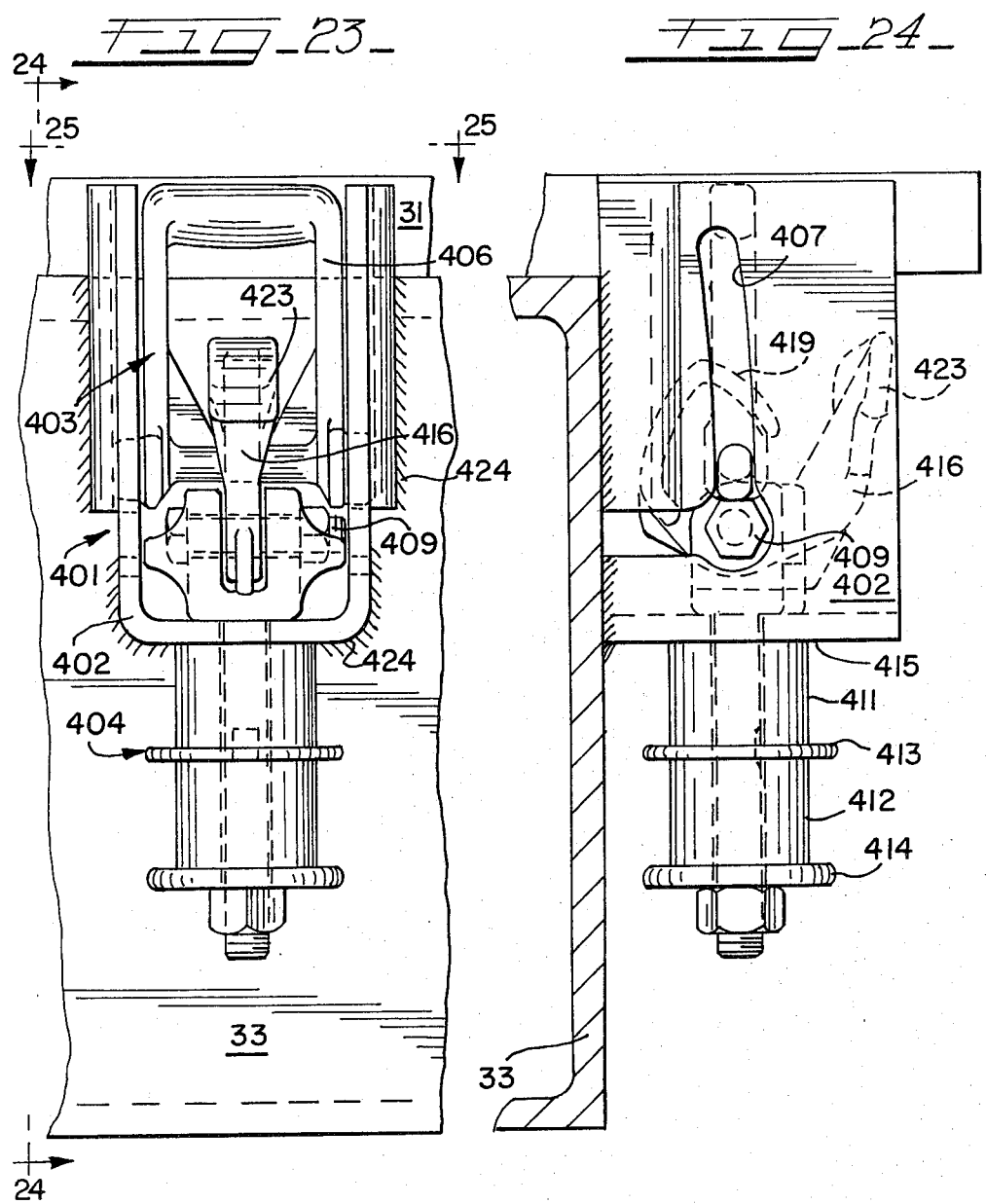

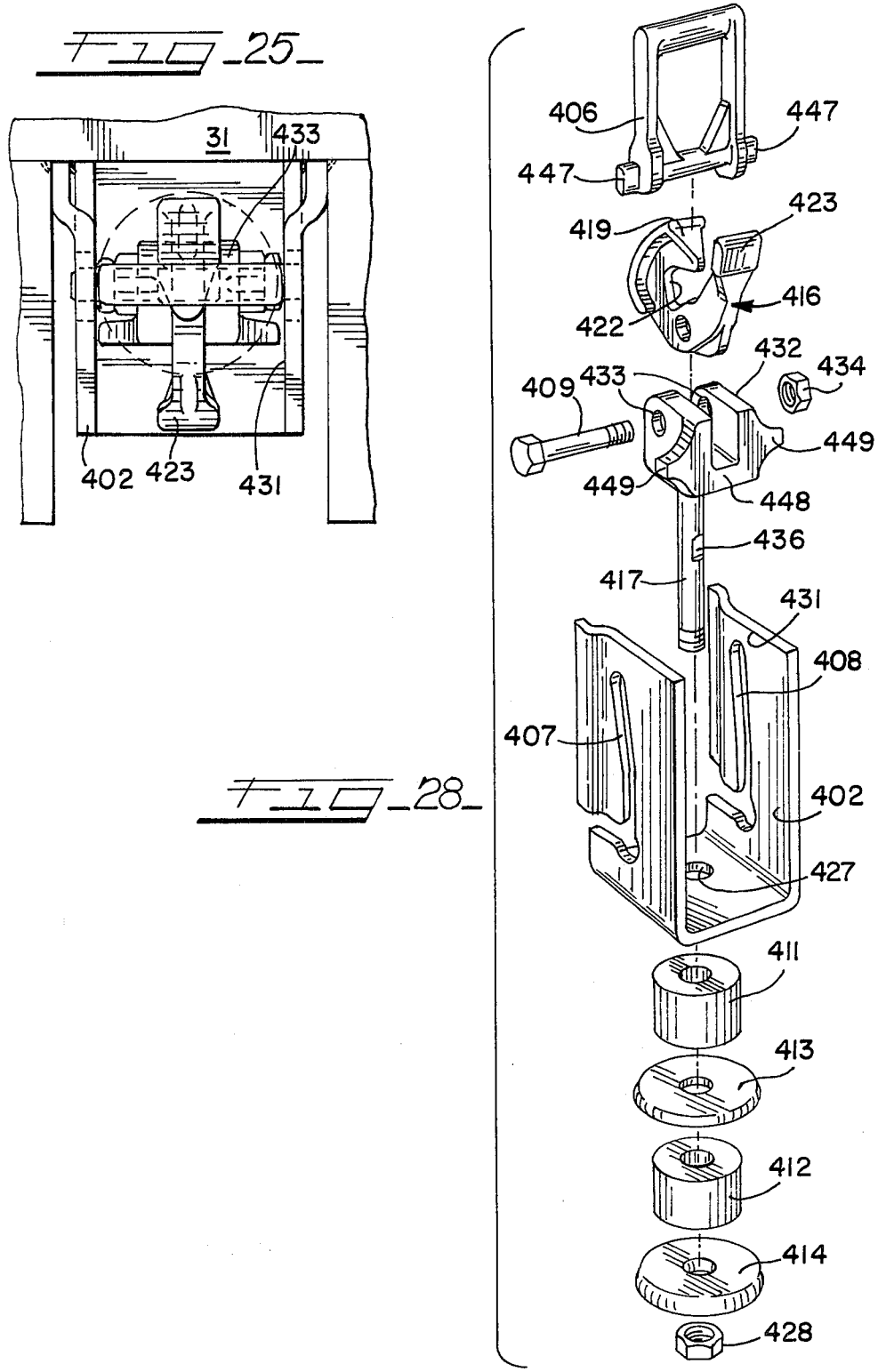

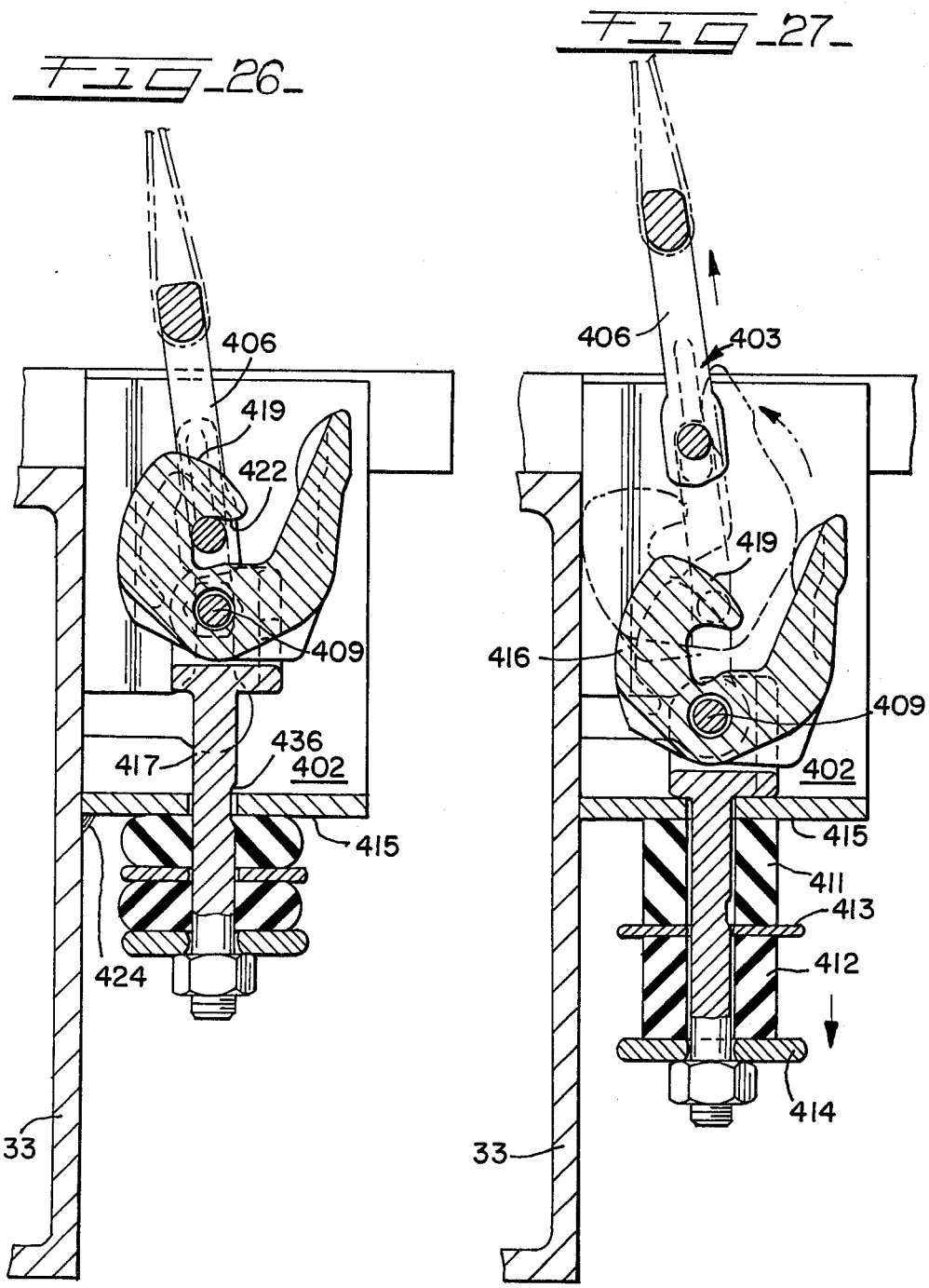

SELF-RESETTING SNUBBING AND ANCHORING DEVICE

BACKGROUND AND DESCRIPTION OF THE INVENTION

This invention generally relates to mechanisms for the quick release of tension in lading strapping that is secured about cargo, more particularly to self-resetting, generally vertically operable quick-release mechanism having a housing directly secured to a railway freight car within which is generally vertically movable an anchor assembly having a lading tie anchor to which the lading strapping is attached, the anchor assembly being automatically locked within the housing by the operation of gravity to maintain tension in the lading strapping by a snubber mechanism during transport of the cargo and being unlockable when desired to quickly relieve the tension prior to removal of the lading strapping.

Various commodities are shipped in open freight carrying cars, requiring that such cargo be tied down for safe transport over long distances and rough terrain or tracks, such commodities including, for example, logs, lumber, plaster board, and large bulky items such as machinery. In some instances, the lading straps, which typically are steel bands, are secured to bolts, U-brackets, hooks, or the like that are simply welded to the railway car, and the strapping is typically removed by severing or otherwise unfastening the strapping which then has a tendency to spring around the cargo and fly up, posing a possible danger to workmen and/or the cargo.

Often, such lading strapping systems incorporate snubbing devices to develop and maintain tension within the lading strapping while the cargo is being transported, but at times these devices are not structured so as to be easily and quickly releasable, with the result that workers typically sever the lading straps while they are still under substantial tension around the cargo, whereupon they will usually spring up and fly about.

In an effort to enhance the ease of operation and improve the safety of these types of devices, quick-release mechanisms have been provided whereby the tension under which the lading straps are compressed can be substantially eliminated before the strapping is removed or severed. The types of quick-release mechanisms that are heretofore known are typically of a type which are mounted such that one end thereof is generally even with the deck level, often within troughs at the edge of the deck, and such that the bulk of the device projects above the deck level when it is under tension from the strapping. Usually such devices will be designed such that, when they are not in use for tensioning the strapping around cargo during transport thereof, they are supposed to lie within the trough for storage. It sometimes happens, however, that such devices are not properly laid within their respective troughs, but lie at least in part on the floor or bed of the freight car, at which position they can be readily damaged by lift trucks while the cargo is being unloaded from the freight car, or they can pose an obstacle for workers on the freight car. Even when such devices are properly stored in their troughs when not in use, they are subject to being damaged by rattling about within the troughs or to bouncing out of the troughs as the car is transported over rough terrain or track while they are not under tension from cargo strapping.

Additionally, quick-release mechanisms of this general type are somewhat labor intensive in that a workman must manually reset each device whereby it can be made operable by locking the snubber unit into place before applying the lading strapping and tensioning the strapping around the cargo.

By the present invention, these various difficulties and problems are substantially removed by providing a self-resetting type of quick-release mechanism that is rigidly mounted directly to the side of the freight trailer or car, the device having a structure such that tension that is developed within lading strapping secured over cargo in opposition to snubber means is quickly and readily released by moving the device to an unlocked position, after which the strapping can be safely removed or severed, at which time the quick-release mechanism automatically falls down by gravity to reset its locked condition, which is free and clear of the trailer or car deck, the device thus being locked or reset for subsequent application of strapping tension or for transport of the freight car over rough terrain when it is not in use to anchor lading strapping over cargo, whereby the device remains safely tucked away to avoid interference with lift trucks or workmen.

It is accordingly a general object of this invention to provide an improved quick-release device for anchoring lading strapping.

Another object of the present invention is an improved lading strapping quick-release device which is self-resetting or automatically locking.

Another object of the present invention is an improved quick-release mechanism for tensioning lading strapping which includes locking means to lessen workman labor by being automatically reset when its snubber mechanism drops in the housing by the force of gravity.

Another object of this invention is an improved quick-release device for anchoring lading strapping having a self-reset condition at a location generally flush with the floor of the trailer or car.

These and other objects of the present invention will be apparent from the following detailed description of four particular embodiments thereof, taken in conjunction with the accompanying drawings, wherein:

FIG. 3 is a front elevational view generally along line 3—3 of FIG. 1, illustrating the preferred embodiment of this invention in its locked and relaxed position;

FIG. 4 is a side elevational view of the locked and relaxed device illustrated in FIG. 3;

FIG. 5 is a top plan view generally along the line 5—5 of FIG. 3;

FIG. 6 is a side elevational view of the preferred device shown in its locked position and tensioned condition, illustrating its unlocking motion in phantom;

FIG. 7 is a side sectional view of the preferred device in its unlocked and relaxed condition after quick release and prior to removal of the lading strap;

FIG. 8 is an exploded, perspective view of the device of FIG. 3;

FIG. 9 is a front elevational view, partially broken away, of an alternative embodiment according to this invention illustrating the locked and relaxed position thereof;

FIG. 10 is a side elevational view, partially broken away, of the device of FIG. 9, partially in section, further illustrating the locked and relaxed position;

FIG. 11 is a top plan view along the line 11—11 of FIG. 9;

FIG. 12 is a side sectional view of the device of FIG. 9 in its locked and tensioned condition;

FIG. 13 is a side sectional view of the device of FIG. 9, after quick-release and prior to removal of the lading strap;

FIG. 14 is an exploded, perspective view of the device of FIG. 9;

FIG. 15 is a front elevational view, partially in section, of another embodiment illustrating the locked and relaxed condition thereof;

FIG. 16 is a side elevational view, partially broken away, along the line 16—16 of FIG. 15;

FIG. 17 is a top plan view along the line 17—17 of FIG. 15;

FIG. 18 is a front sectional view of the device in FIG. 15;

FIG. 19 is a side sectional view illustrating the device of FIG. 15 in its locked position and tensioned condition;

FIG. 20 is a side sectional view illustrating the device of FIG. 15 in its unlocked and relaxed condition after quick release and prior to removal of the lading strap;

FIG. 21 is an exploded, perspective view of the device of FIG. 15;

FIG. 22 is a partial side elevational view showing an alternative latch striking surface structure;

FIG. 23 is a front elevational view of yet a further embodiment, showing same in its locked and relaxed condition;

FIG. 24 is a side elevational view along the line 24—24 of FIG. 23;

FIG. 25 is a top plan view along the line 25—25 of FIG. 23;

FIG. 26 is a side, sectional view of the device of FIG. 23, illustrating its locked position and tensioned condition;

FIG. 27 is a side, sectional view showing the device of FIG. 23 in its unlocked and relaxed condition after quick release and prior to removal of the lading strap; and FIG. 28 is an exploded, perspective view of the device of FIG. 23.

Each of the embodiments operate in substantially the same manner. The device is automatically locked by generally vertical dropping movement of a lading tie anchor assembly and a lading strap is fastened to a lading tie anchor of the anchor assembly. Then, the lading strap is put under tension while a snubber assembly is compressed in opposition to the strap tensioning forces, at which time the cargo is ready for shipment. Upon reaching the desired destination, the device is unlocked by generally vertical movement of a assembly kicker member, thereby releasing the tension within the snubber assembly and permitting upward movement of the lading tie anchor in order to relax the tension within the strapping so that it may be readily and safely removed to permit unloading of the cargo.

Figure 1:
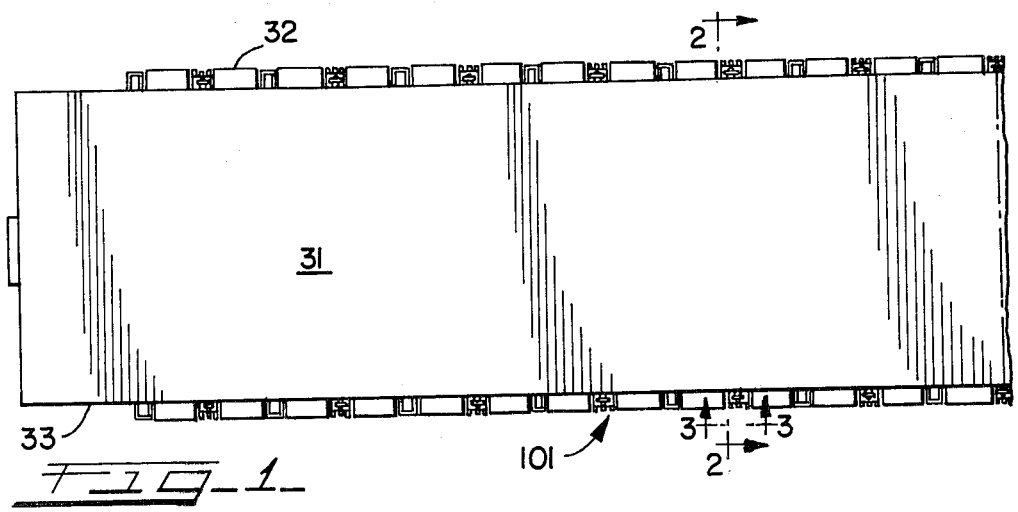
FIG. 1 is a plan view of a portion of a flat bed car having a plurality of self-resetting quick-release mechanisms according to this invention.
Figure 2:
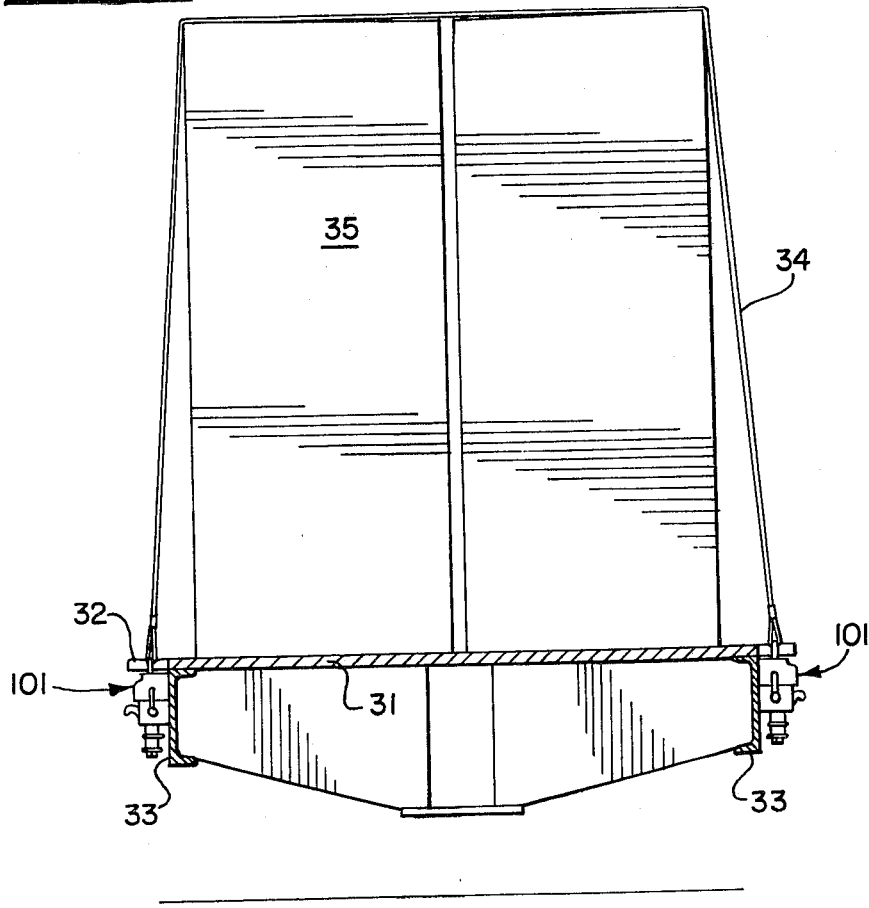
FIG. 2 is a sectional view generally through line 2—2 of FIG. 1.

A flat car bed 31, illustrated in FIGS. 1 and 2, includes a plurality of storage troughs 32 that are sometimes included on railway flat cars for storage of conventional quick-release mechanisms. The self-resetting devices according to this invention, which are designated generally at 101, can be securely fastened directly to a side sill 33 of the car, there being no need to include the storage troughs 32. A length of lading strapping 34 is shown tensioned over cargo 35, which is ready for transport.

Device 101, which is more fully illustrated in FIGS. 3 through 8, includes a housing, generally designated 102, an anchor assembly, generally designated 103, a snubber assembly generally indicated at 104, and a locking assembly generally designated as 105, the anchor assembly 103 being generally vertically movable within the housing 102 between an automatically retracted, locked position thereof and a generally extended, unlocked position. The anchor assembly 103 includes a lading tie anchor 106 for receiving the lading strapping 34. The locking assembly 105 is structured to automatically engage the anchor assembly 103 when the anchor assembly 103 is permitted to fall by gravity generally within the housing 102, the locking assembly 105 permitting release of the anchor assembly 103 to a generally extended, unlocked position. Constraint members, including elongated slots 107, 108 and a retaining pin 109 of the anchor assembly 103, retains the anchor assembly 103 within the housing 102 and restricts the extent of its movement.

FIGS. 3, 4 and 5 particularly illustrate the device 101 in its locked position, with the snubber assembly 104 being in a relaxed condition whereby elastomeric inserts 111 and 112 are not compressed between thrust plates 113, 114 and an underside surface 115 of the housing 102. In this locked position, a latch 116 of the locking assembly 105 operatively engages a receiving member of the snubber assembly 104 such as a U-bolt 117 shown, an I-bolt, or the like. The U-bolt 117 is preferably held in place with the assistance of a plate 118 rigidly secured thereto.

The automatic locking feature of this embodiment is perhaps best illustrated in FIGS. 6 and 7. With the device 101 in the unlocked and relaxed condition shown in FIG. 7, the anchor assembly 103 falls by gravity within the housing 102 when the lading strapping 34 is removed, at which time a deflection ledge 119 on the bottom of the latch 116 momentarily engages the U-bolt 117 to deflect the latch 116 generally to the right or in counterclockwise rotation about the retaining pin 109 as illustrated in phantom in FIG. 6, excessive movement in this regard preferably being prevented by the latch 116 butting against a stop surface 121 of the anchor assembly 103, after which the latch 116 rotates generally clockwise until the U-bolt 117 is positioned within a hooking indent 122 of the latch 116, which is the position illustrated in FIGS. 3, 4 and 5, this positioning being one at which the dropping movement of the anchor assembly 103 had been stopped by having the edge 119 rest on the plate 118 and/or having the retaining pin 109 reach the lower end of the elongated slots 107 and 108.

With the device 101 in the locked and automatically retracted condition and with the snubber assembly 104 relaxed as illustrated in FIGS. 3, 4 and 5, the device 101 is ready for removal of the cargo 35 from the flat car bed 31 by workmen and/or fork-lift trucks and for subsequent transport of the freight car across rough terrain or tracks with the device 101 being retracted and tucked safely out of the way. At this position, the device 101 is also automatically ready for affixing the lading strapping 34 to the lading tie anchor 106 and then tensioning the lading strapping 34 by conventional means so as to compress the elastomeric inserts 111, 112 of the snubber assembly 104 to the condition illustrated in FIG. 6 in order to securely fasten the cargo 34 to the flat car bed 31.

When it is desired to remove the cargo 35, the latch 116 is deflected upwardly by a workman using a pry bar, sledge or hook (not shown) to engage and move a latch surface 123 in order to rotate the latch 116 about the rotating pin 109 in a counterclockwise direction as illustrated by the arrow in FIG. 6 until the hooking indent 122 clears the U-bolt 117, at which time the anchor assembly 103 is raised generally upwardly by the tension within the lading strapping 34, such upward movement being stopped, if necessary, by the upper end of the elongated slots 107 and 108 or by engagement of the lading tie anchor 106 and the top panel of the housing 102.

Further details of the structure can be seen from FIG. 8, as can the ease with which the various parts of the device 101 may be repaired or replaced without having to break the rigid attachment, such as welds 124, of the housing 102 to the side sill 33. Housing 102 itself may be composed of two pieces, one a snubber assembly guide member 125, the other a lading tie anchor assembly guide member 126, both of which are rigidly secured to the side sill 33 juxtaposed to each other so as to form the continuous elongated slots 107 and 108. The anchor assembly 103 is assembled by rotating the lading tie anchor 106 such that its head 129 passes upwardly through the lading tie anchor assembly guide members 126, and more particularly through an aperture 131 through the upper surface of the housing guide member 126, after which the lading tie anchor 106 is again rotated such that a clevis 132 thereon is in alignment with the slots 107 and 108 whereby the retaining pin 109 can be passed through the slot 107, through clevis bores 133, and through the slot 108, after which retainers 134, 135 are securely fastened to the retaining pin 109 by any conventional structure means, such as be welds, clips, threads or cotter pins. The snubber assembly 104 is assembled by passing the legs of the U-bolt through holes 127 within the snubber assembly guide member 125 until the plate 118 abuts the inside bottom surface thereof, after which the elastomeric inserts 111, 112 and the thrust plates 113, 114 are slid over the legs and secured thereto by nuts 128 or the like.

Typically, the snubber assembly 104, as well as the snubber assembly of the other embodiments of this invention, will provide a force of approximately three thousand pounds when the elastomeric inserts, 111, 112 are compressed for maintaining tension in the lading strapping 34 for transport of the cargo 35. As an optional feature of this invention, application of the desired force is indicated when the bottom portion of the latch surface 123 is in general alignment with a ledge 136 of the housing guide member 126, as generally illustrated in FIG. 6.

Referring to the embodiment illustrated in FIG. 9 through FIG. 14, a device designated at 201, includes a housing 202, an anchor assembly, generally designated 203, a snubber assembly generally indicated at 204, and a locking assembly generally designated as 205, the achor assembly 203 being generally vertically movable within the housing 202 between an automatically retracted, locked position thereof and a generally extended, unlocked position. The anchor assembly 203 includes a lading tie anchor 206 for receiving the lading strapping 34. The locking assembly 205 is structured to automatically engage the anchor assembly 203 when the anchor assembly 203 is permitted to fall by gravity generally within the housing 202, the locking assembly 205 permitting release of the anchor assembly 203 to a generally extended, unlocked position. Constraint members, including an inside front surface 207 of the housing 202 and certain interengaging edge surfaces of a lock or latch 216 and a lever or swing arm 208 of the anchor assembly 203, retains the anchor assembly 203 within the housing 202 and restricts the extent of its movement.

FIGS. 9, 10 and 11 particularly illustrate the device 201 in its locked position, with the snubber assembly 204 being in a relaxed condition whereby elastomeric inserts 211 and 212 are not compressed between thrust plates 213, 214 and an underside surface 215 of the anchor assembly 203. In this locked position, the latch 216 of the locking assembly 205 operatively engages the swing arm 208; more particularly, when the device 201 is locked, a dog 217 butts against a stop 218 or is positioned to butt against the stop 218 in opposition to a generally upward force on the anchor assembly 203.

Concerning the automatic locking feature of this embodiment, with the device 201 in the locked position and the snubber assembly relaxed condition shown in FIG. 13, the anchor assembly 203 falls by gravity within the housing 202 when the lading strapping 34 is removed, at which time a deflection ledge 219 on the latch 216 momentarily engages the thrust plate 213 as the combined anchor assembly 203 and the snubber assembly 204 falls past the latch 216 to deflect the latch 216 generally to the right or in clockwise rotation about its pivot pin 237 until it falls down into its locking position as shown in FIGS. 9 through 12. Simultaneously with the dropping of the combined anchor assembly 203 and snubber assembly 204, the swing arm 208 rotates generally counterclockwise about its pivot pin 238 whereby its dog 217 moves into or is poised for locking engagement with the stop 218 of the latch 216.

With more particular regard to the constraint members, the dropping of the combined anchor assembly 203 and snubber assembly 204 is completed when a stop surface 221 of the swing arm 208 abuts against the inside front surface 207 of the housing 202. Raising of the combined achor assembly 203 and snubber assembly 204 within the housing 202 is stopped, if necessary, when the dog 217 of the swing arm 208 engages an indent 222 of the latch 216 and/or when a flat 251 of the latch 216 engages a barrel 252 of the swing arm 208, which also serves to hold the latch 216 in its far counterclockwise orientation to be properly positioned for its clockwise rotation to its locking position upon being kicked by the falling snubber assembly 204.

With the device 201 in the locked and automatically retracted condition and with the snubber assembly 204 relaxed as illustrated in FIGS. 9, 10 and 11, the device 201 is out of the way and ready for removal of the cargo 35 from the flat car bed 31 by workmen and/or fork-lift trucks and for subsequent transport of the freight car across rough terrain or tracks with the device 201 being retracted and tucked safely out of the way. At this position, the device 201 is also automatically ready for affixing the lading strapping 34 to the lading tie anchor 206 and then tensioning the lading strapping 34 by conventional structure so as to compress the elastomeric inserts 211, 212 of the snubber assembly 204 to the condition illustrated in FIG. 12 in order to securely fasten the cargo 34 to the flat bed car 31.

When it is desired to remove the cargo 35, the latch 216 is deflected to the left or generally upwardly by a workman using a pry bar, sledge or the like to engage or strike a latch surface 223 in order to rotate the latch 216 about the pivot pin 237 in a counterclockwise direction as illustrated by the arrow in FIG. 12, at which time the swing arm 208 rotates about pivot pin 238 and anchor assembly 203 is raised generally upwardly by the tension within the lading strapping 34, such upward movement being stopped, if necessary, when the indent 222 engages the dog 217 as a portion of the assembly 203 passes through an aperture 231 of the housing 202.

Further details of the structure can be seen from FIG. 14, as can the ease with which the various parts of the device 201 may be repaired or replaced without having to break the rigid attachment, such as welds 224, of the housing 202 to the side sill 33. The snubber assembly 204 of the anchor assembly 203 is assembled by passing the lading tie anchor 206 through hole 227 within a snubber assembly guide member 225 while passing the anchor 206 through the elastomeric inserts 211, 212 and the thrust plates 213, 214, which are secured to the anchor 206 by a nut 228. The swing arm 208 is next assembled to the snubber assembly guide member 225 by passing a retaining pin 209 through bores 233 within a clevis 232 thereof and through a bore 239 of the swing arm 208, this assembly being held together by a retainer 234 in order to complete the combined anchor assembly 203 and snubber assembly 204 which is rotatably secured to the welded-in-place housing 202 by passing a pivot pin 238 through a swing arm elongated bore 241. Then, the pivot pin 237 is used to secure the latch 216 through its elongated bore 242.

A particularly advantageous feature of this embodiment is the location of the latch surface 223 with respect to the bed 31, the latch surface 223 being at roughly the same level as the deck or bed 31, which feature is useful to provide easy access to the latch surface 223 by workmen when the bed 31 is positioned adjacent to a loading dock (not shown) of a height substantially the same as the bed 31.

Another embodiment, device 301, is more fully illustrated in FIGS. 15 through 22. Device 301 includes a housing, generally designated as 302, an anchor assembly, generally designated 303, a snubber assembly generally indicated at 304, and a locking assembly generally designated as 305, the anchor assembly 303 being generally vertically movable within the housing 302 between a generally retracted, locked position thereof and a generally extended, unlocked position. The anchor assembly 303 includes a lading tie anchor 306 for receiving the lading strapping 34. The locking assembly 305 is structured to automatically engage the anchor assembly 303 when the anchor assembly 303 is permitted to fall by gravity generally within the housing 302, locking assembly 305 permitting release of the anchor assembly 303 to a generally extended, unlocked position. Constraint members, including an inside front surface 307 of the housing 302 and a lever or swing arm 308 of the anchor assembly 303, retains the anchor assembly 303 within the housing 302 and restricts the extent of its movement.

FIGS. 15, 16, 17 and 18 particularly illustrate the device 301 in its locked position, with the snubber assembly 304 being in a relaxed condition whereby elastomeric inserts 311, 312 are not compressed between thrust plates 313, 314 and inside surface 115 of the anchor assembly 303. In this locked position, a locking pawl or latch 316 of the locking assembly 305 operatively engages the swing arm 308; more particularly, when the device 301 is locked, a dog 317 butts against a bar or stop 318 or is positioned to butt against the stop 318 in opposition to a generally upward force on the anchor assembly 303.

The automatic locking feature of this embodiment is perhaps best seen from FIGS. 16 and 20. With the device 301 in the unlocked position and snubber assembly relaxed condition shown in FIG. 20, the anchor assembly 303 falls by gravity within the housing 302 when the lading strapping 34 is removed, at which time the dog 317 on the swing arm 308 engages a rotation bar or deflection ledge 319 of the latch 316 to deflect the latch 316 generally downwardly or in counterclockwise rotation as illustrated by the arrow in FIG. 20, about its pivot extensions 337 until it falls down into its locking position as shown in FIG. 16. As the combined anchor assembly 303 and snubber assembly 304 and its swing arm 308 fall, the swing arm 308 rotates in a clockwise direction as shown by the arrow in FIG. 20 until the dog 317 rests against the deflection ledge 319 to define the constraint of downward movement of the combined anchor assembly 303 and snubber assembly 304 and to position the stop 318 for locking engagement with the dog 317. Constraint members in the upward direction include a stop surface 321 of the swing arm 308 and the inside front surface 307 of the housing 302.

With the device 301 in the locked and automatically retracted condition and with the snubber assembly 304 relaxed as illustrated in FIG. 16, the device 301 is ready for removal of the cargo 35 from the flat car bed 31 by workmen and/or fork-lift trucks and for subsequent transport of the freight car across rough terrain or tracks with the device 301 being retracted and tucked safely out of the way. At this position, the device 301 is also automatically ready for affixing the lading strapping 34 to the lading tie anchor 306 and then tensioning the lading strapping 34 by conventional means so as to compress the elastomeric inserts 311, 312 of the snubber assembly 304 to the condition illustrated in FIG. 19 in order to securely fasten the cargo 34 to the flat car bed 31.

When it is desired to remove the cargo 35, the latch 316 is deflected upwardly by a workman using a pry bar, sledge or hook (not shown) to engage and move a latch surface 323 in order to rotate the latch 316 about the pivot extensions 337 in a clockwise direction as illustrated by the arrow in FIG. 19 until the dog 317 clears the stop 318 at which time the anchor assembly 303 is raised generally upwardly by the tension within the lading strapping 34, such upward movement being stopped, if necessary, by the engagement of the inside front surface 307 and the stop surface 321 as a portion of the assembly 303 passes through an aperture 331 of the housing 302.

Further details of the structure can be seen from FIG. 21, as can the ease with which the various parts of the device 301 may be repaired or replaced without having to break the rigid attachment, such as welds 324, of the housing 302 to the side sill 33. Housing 302 itself may be composed of two pieces, one a snubber means guide member 325, the other locking means guide member 326, both of which are rigidly secured to the side sill 33 juxtaposed to each other. The snubber assembly 304 is assembled by passing the lading tie anchor 306 through hole 327 within the snubber guard 343, after which the elastomeric inserts 311, 312 and the thrust plates 313, 314 are slid over the anchor 306 and secured thereto by nut 328 or the like. The anchor assembly 303 is assembled by passing the retaining pin 309 through the clevis 332 of the swing arm 308, through clevis bores 333, and through the anchor bore 339 after which a retainer 334 is securely fastened to the retaining pin 309 by any conventional means, such as by welds, clips, threads or cotter pins. The thus assembled lading tie anchor assembly 303 is then inserted into the housing 302 such as through an aperture 331 therein and rotatably secured to the housing 302 by passing a pivot pin 338 through a swing arm elongated bore 341 and through holes 344 within the housing 302. Then, the latch 316 is rotated so that flats on the pivot extensions 337 are aligned with slots 345, and the latch 316 is slid through slots 345 and into pivot openings 346.

As an optional feature of this invention, an indicator marking may be included in association with the snubber assembly 304, such as a raised portion 336 to indicate the application of the desired force when the thrust plate 313 is in general alignment with the raised portion 336 as generally illustrated in FIG. 19. FIG. 22 illustrates an alternative configuration of the latch surface 323' which is particularly designed to accomodate a hook tool to rotate the latch 316 for unlocking the device 301.

FIGS. 23 through 28 depict a further embodiment, device 401, which includes a housing 402, having an upper aperture 431 for accomodating upward passage of an anchor assembly, generally designated 403, the self-resetting device 401 further including a snubber assembly generally indicated at 404, and locking means generally designated as 405, the anchor assembly 403 being generally vertically movable within the housing 402 between a generally retracted, locked position thereof and a generally extended, unlocked position. The anchor assembly 403 includes a lading tie anchor 406 for receiving the lading strapping 34. The locking assembly 405 is structured to automatically engage the anchor assembly 403 when the anchor assembly 403 is permitted to fall by gravity generally within the housing 402, locking assembly 405 permitting release of the anchor assembly 403 to a generally extended, unlocked position. Constraint members, including elongated slots 407, 408 and ears 447 of a lading tie anchor 406, retain the anchor 406 within the housing 402 and restrict the extent of its movement.

FIGS. 23, 24, 25 and 26 particularly illustrate the device 401 in its locked position, with the snubber assembly 404 being in a relaxed condition whereby elastomeric inserts 411, 412 are not compressed between thrust plates 413, 414 and an underside surface 415 of the housing 402. In this locked position, a latch 416 of the locking assembly 405 operatively engages a receiving member of the lading tie anchor 406.

The automatic locking feature of this embodiment is perhaps best illustrated in FIGS. 26 and 27. With the device 401 in the unlocked and relaxed condition shown in FIG. 27, the anchor 406 falls by gravity within the housing 402 when the lading strapping 34 is removed, at which time a deflection ledge 419 on the top of the latch 416 momentarily engages the anchor 406 to deflect the latch 416 generally to the left or in counterclockwise rotation about a retaining pin 409 through a latch retaining member 448 of an I-bolt 417, as illustrated in phantom in FIG. 27, excessive movement in this regard preferably being prevented by the latch 416 butting against side sill 33, after which the latch 416 rotates generally clockwise until the lading tie anchor 406 is positioned within a hooking indent 422 of the latch 416, which is the position illustrated in FIGS. 23, 24 and 25, this positioning being one at which the dropping movement of the anchor assembly 403 had been stopped by having the anchor 406 rest on the latch and/or having the ears 447 reach the lower end of the elongated slots 407 and 408.

With the device 401 in the locked and automatically retracted condition and the snubber assembly 404 relaxed, the device 401 is ready for removal of the cargo 35 from the flat car bed 31 by workmen and/or fork-lift trucks and for subsequent transport of the freight car across rough terrain or tracks with the device 401 tucked safely out of the way. At this position, the device 401 is also automatically ready for affixing the lading strapping 34 to the lading tie anchor 406 and then tensioning the lading strapping 34 by conventional structure so as to compress the elastomeric inserts 411, 412 of the snubber means 404 to the condition illustrated in FIG. 26 in order to securely fasten the cargo 34 to the flat car bed 31.

When it is desired to remove the cargo 35, the latch 416 is deflected toward the flat bed 31 by a workman using a pry bar, sledge or hook (not shown) to engage or strike a latch surface 423 in order to rotate the latch 416 about the rotating pin 409 in a counterclockwise direction as illustrated by the arrow in FIG. 27 until hooking indent 422 clears the anchor 406, at which time the anchor assembly 403 is raised generally upwardly by the tension with the lading strapping 34, such upward movement being stopped, if necessary, by the ears 447 engaging the upper end of the elongated slots 407 and 408.

Further details of the structure can be seen from FIG. 28, as can the ease with which the various parts of the device 401 may be repaired or replaced without having to break the rigid attachment such as welds 424, of the housing 402 to side sill 33. The combined anchor assembly 403 and locking assembly 405 are assembled by sliding the ears 447 of the anchor 406 through the elongated slots 407 and 408, and passing the retaining pin 409 through bores 433 within a clevis 432 of the latch retainer member 448 and a bore 442 of the latch 416 and securing same together by a retainer 434. The snubber assembly 404 is assembled by passing the leg of the I-bolt 417 through a hole 427 of the housing 402 until the underside surface of the latch retainer member 448 butts against the bottom of the housing 402, after which the elastomeric inserts 411, 412 and the thrust plates 413, 434 are slid over the I-bolt 417 and secured thereto by a nut 428 or the like. Bosses 449 on the latch retainer member 448 prevent any substantial turning of the member 448 when assembled within the housing 402 and thus assure working, locking alignment between the lading tie anchor 406 and the latch 416.

As an optional feature of this embodiment, an indicator marking, such as an indent 436 on the I-bolt 417, may be included to indicate the application of a desired force when the indent 436 is visible above the inside bottom surface of the housing 402, as generally illustrated in FIG. 26.

It will be apparent to those skilled in this art that the present invention can be embodied in various additional forms; accordingly, this invention is to be construed and limited only by the scope of the appended claims.

We claim:

1. Self-resetting lading tie anchor and snubbing device for releasably anchoring lading strapping to railway freight cars, comprising:

a housing for securement to a railway freight car, said housing having an upper aperture therethrough;

a lading tie anchor assembly, at least a portion of which passes through said housing upper aperture, said lading tie anchor assembly being generally vertically movable between a generally retracted, locked position thereof and a generally extended, unlocked position thereof;

snubber means affixed to said lading tie anchor assembly, said lading tie anchor assembly transmitting tension within the lading strapping to said snubber means, and said snubber means maintaining tension in the lading strapping;

vertical movement constraint means for preventing upward passage of said lading tie anchor assembly completely out of said housing;

locking means for automatically setting said lading tie anchor assembly to said generally retracted, locked position and for releasing said lading tie anchor assembly to said generally extended, unlocked position to reduce the tension within the snubber means; and said locking means includes a rotatably mounted latch having a deflection ledge in momentary operative interengagement with an assembly of the device that drops into said housing by gravitational forces.

2. The self-resetting device of claim 1, wherein said snubber means includes an elastomeric insert, a thrust plate, and a surface of said device.

3. The self-resetting device of claim 1, wherein said locking means includes a rotatably mounted latch having a deflection ledge that rotates by deflecting operative interengagement with a portion of said lading tie anchor assembly when said assembly drops downwardly within said housing.

4. The self-resetting device of claim 1, wherein said locking means includes a rotatably mounted latch having a generally vertically movable latch surface for unlocking said device.

5. The self-resetting device of claim 1, wherein said housing is rigidly secured to a side sill of the freight car.

6. The self-resetting device of claim 1, wherein said lading tie anchor assembly includes a lading tie anchor head that projects generally above said housing.

7. The self-resetting device of claim 1, wherein said anchor assembly falls downwardly within said housing when said tension within said lading strapping is reduced.

8. The self-resetting device of claim 1, wherein said lading tie anchor assembly has a lading strap receiving head that has a maximum height approximately equal to that of the freight car bed when the device is retracted.

9. The self-resetting device of claim 1, wherein means are provided for indicating the extent of compression of the snubber means.

10. The self-resetting device of claim 1, further including stops to restrict rotation of a rotatably mounted latch of said lock means.

11. The self-resetting device of claim 1, wherein said locking means includes a rotatable latch surface that is generally at the top portion of said housing when said locking means is in its locked position.

12. The self-resetting device of claim 1, wherein said constraint means includes an elongated slot in said housing and a projecting member of said anchor assembly that is slidably mounted within said slot.

13. The self-resetting device of claim 1, wherein said locking means includes a latch rotatable about a generally horizontal axis that operatively interengages a receiving member of the snubber means.

14. The self-resetting device of claim 1, wherein said snubber means is mounted below said housing.

15. The self-resetting device of claim 1, wherein said constraint means includes an inside front surface of said housing, said latch, and a swing arm rotatably mounted to said housing.

16. The self-resetting device of claim 1, wherein said lading tie anchor assembly includes a swing arm rotatably mounted to said housing along a generally horizontal axis, and said swing arm operatively engages a latch of said locking means when said device is in said generally retracted, locked position.

17. The self-resetting device of claim 1, wherein said snubber means is mounted on said lading tie anchor assembly.

18. The self-resetting device of claim 1, wherein said snubber means is mounted on said lading tie anchor assembly, and said lading tie anchor assembly includes a swing arm rotatably mounted to said housing.

19. The self-resetting device of claim 1, wherein said lading tie anchor assembly includes a swing arm having a dog that operatively interengages a latch of said locking means.

20. The self-resetting device of claim 1, wherein said constraint means includes an indent on a latch of said locking means and a dog on an anchor assembly swing arm mounted to said housing.

21. The self-resetting device of claim 1, wherein said constraint means includes an inside front surface of the housing and a stop surface on a swing arm of said lading tie anchor assembly.

22. The self-resetting device of claim 1, wherein said constraint means includes a pair of generally opposing slots within said housing and a pair of oppositely extending ears on said lading tie anchor assembly.

23. The combination of a railway freight car of the type having a deck and a side sill with a device for securing cargo thereonto by lengths of lading strapping anchored by a quick-release device having receiving means for holding the lading strapping over the cargo, the quick-release device being a self-resetting device comprising:

a housing for securement to the side sill of the railway freight car, said housing having an upper aperture therethrough;

a lading tie anchor assembly, at least a portion of which passes through said housing upper aperture, said lading tie anchor assembly being generally vertically movable between a generally retracted, locked position thereof and a generally extended, unlocked position thereof, said generally retracted position being such that the device has a maximum height approximately equal to that of the side sill;

snubber means affixed to said lading tie anchor assembly, said lading tie anchor assembly transmitting tension within the lading strapping to said snubber means, said snubber means maintaining tension in the lading strapping;

vertical movement constraint means for preventing upward passage of said lading tie anchor assembly completely out of said housing;

locking means for automatically setting said lading tie anchor assembly to said generally retracted, locked position and for releasing said lading tie anchor assembly to said generally extended, unlocked position to reduce tension within the snubber means; and said locking means includes a rotatably mounted latch having a deflection ledge in momentary operative interengagement with an assembly of the device that drops into said housing by gravitational forces.

24. The combination of claim 23, wherein said locking means includes a rotatable latch having a latch striking surface that has a maximum height approximately equal to that of the side sill when lading strapping is tensioned and affixed to said lading tie anchor assembly and the device is locked.

* * * * *

UNITED STATES PATENT AND TRADEMARK OFFICE
CERTIFICATE OF CORRECTION

PATENT NO. : 4,360,299

DATED : November 23, 1982

INVENTOR(S) : Nadherny, Rudolph E. and Sweger, Theodore J.

It is certified that error appears in the above-identified patent and that said Letters Patent are hereby corrected as shown below:

Column 3, line 59, "assembly" should be deleted.

Column 5, line 40, "means" should be deleted.

Column 5, line 40, "be" should read --by--.

Column 9, line 24, "accomodate" should read --accommodate--.

Column 9, line 29, "accomodating" should read --accommodating--.

Signed and Sealed this

Fifteenth Day of March 1983

[SEAL]

Attest:

GERALD J. MOSSINGHOFF

Attesting Officer     Commissioner of Patents and Trademarks